Dec. 20, 1927.
A. J. GERRARD ET AL
1,653,164
WIRE TYING MACHINE
Filed Nov. 18, 1920
4 Sheets-Sheet 1
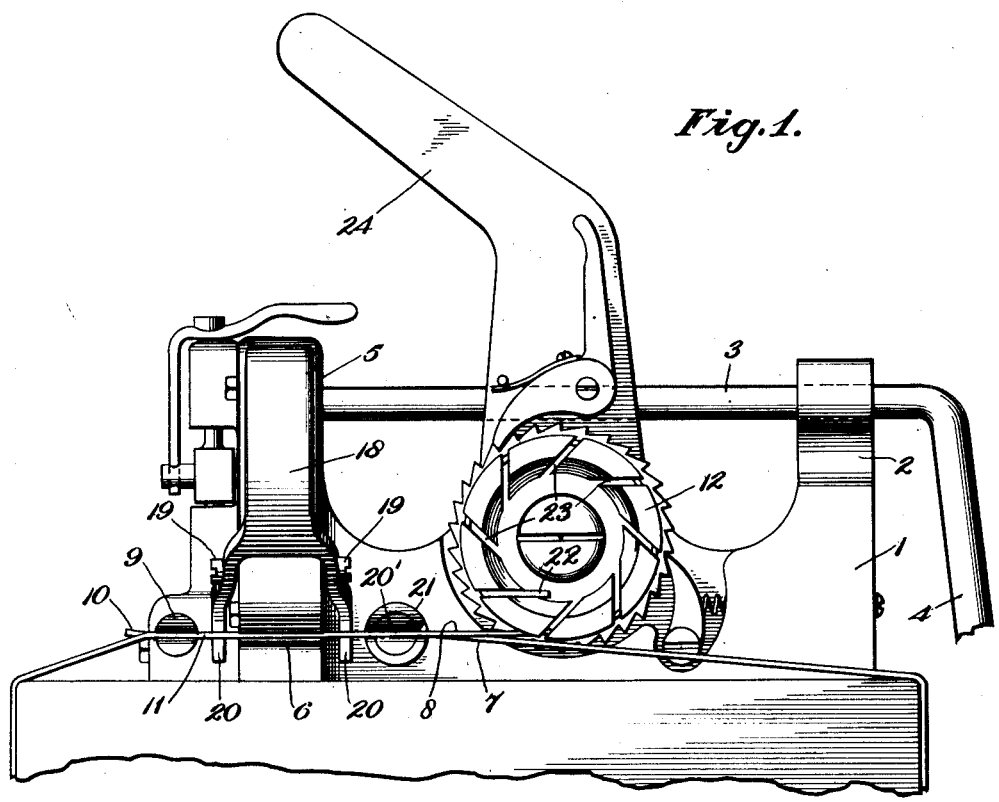
Fig.1.
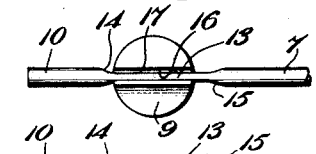
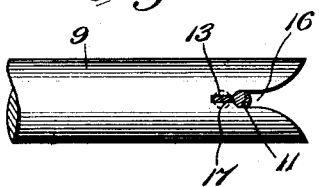
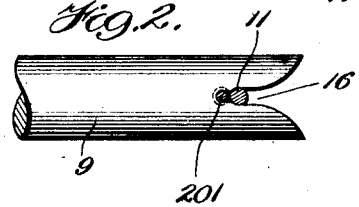
Inventors
Alec J. Gerrard
and Parvin Wright,
by T. A. Witherspoon
Attorney

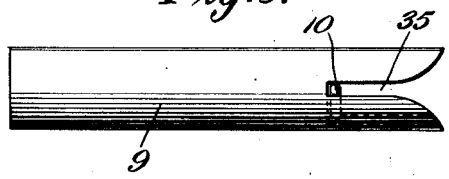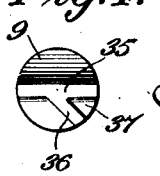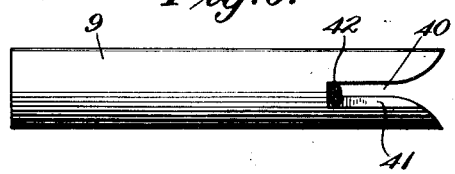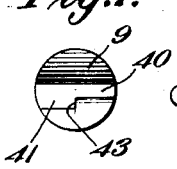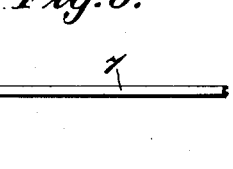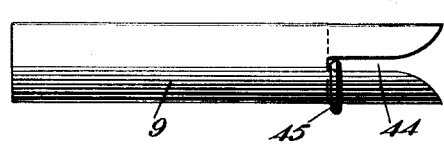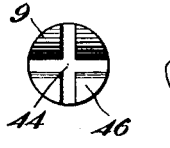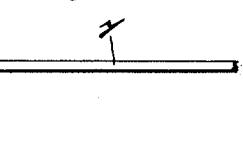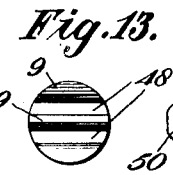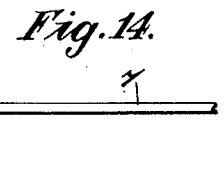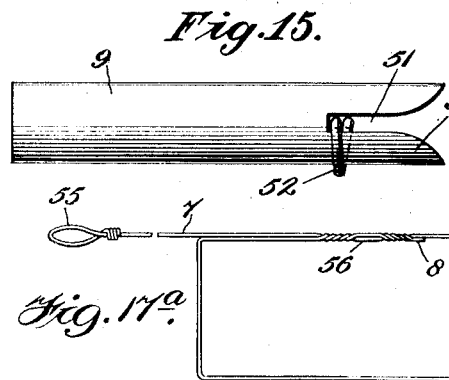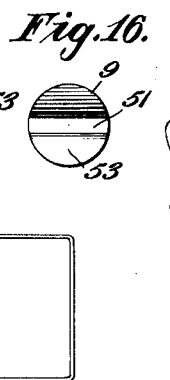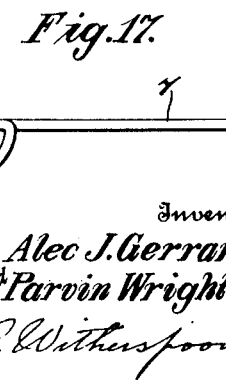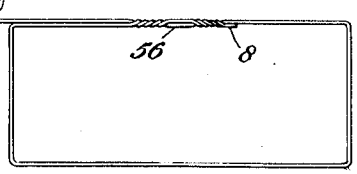

Dec. 20, 1927.  1,653,164
A. J. GERRARD ET AL
WIRE TYING MACHINE
Filed Nov. 18, 1920   4 Sheets-Sheet 3

Inventors
Alec J. Gerrard
and Parvin Wright, by
J. G. Witherspoon
Attorney

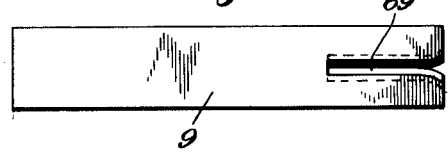
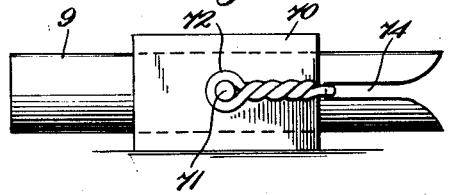
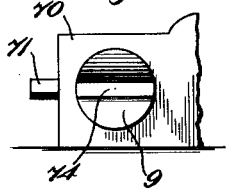
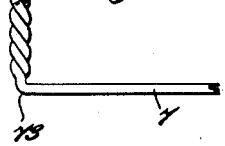
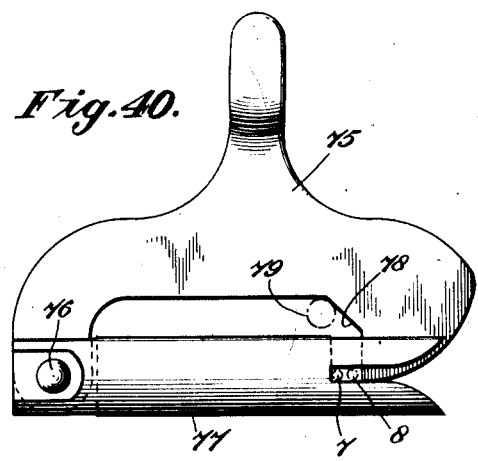
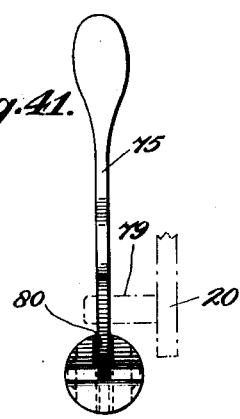
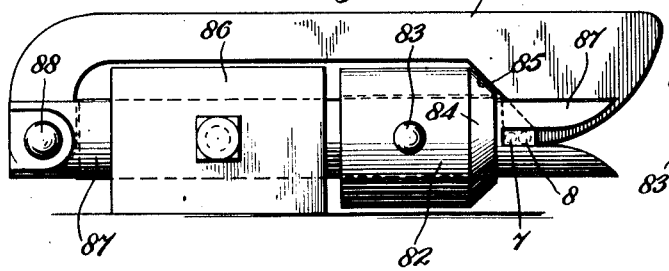
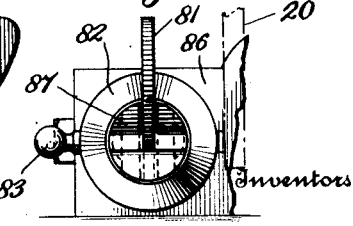

Patented Dec. 20, 1927.

1,653,164

UNITED STATES PATENT OFFICE.

ALEC J. GERRARD AND PARVIN WRIGHT, OF CHICAGO, ILLINOIS; SAID WRIGHT ASSIGNOR TO SAID GERRARD.

WIRE-TYING MACHINE.

Application filed November 18, 1920. Serial No. 424,884.

This invention relates to wire twisting machines and has for its object to provide an apparatus adapted for using a particular kind of a wire and which will be more dependable in action than those heretofore proposed.

With these and other objects in view, the invention consists in the novel details of construction and combinations of parts more fully hereinafter disclosed and particularly pointed out in the claims:

Referring to the accompanying drawings forming a part of this specification, in which like numerals designate like parts in all the views:

Figure 1 is a view of a machine made in accordance with this invention;

Figure 1ª is a view of a wire holding post or projection suitable for use on the machine shown in Figure 1;

Figure 1ᵇ is an end view of the parts shown in Figure 1ª;

Figure 1ᶜ is a view of the wire adapted for use with the post shown in Figure 1ª;

Figure 2 is a view of a somewhat modified form of holding means from that shown in Figure 1ª;

Figure 2ª is a view of the wire adapted for use with the means shown in Figure 2;

Figure 3 is a modified view of wire holding means;

Figure 4 is an end view of the means shown in Figure 3;

Figure 5 is a view of the wire adapted for use in connection with Figures 3 and 4;

Figure 6 is a further modified form of wire holding means;

Figure 7 is an end view of the parts shown in Figure 6;

Figure 8 is a view of the wire adapted for use with the means shown in Figure 6;

Figure 9 is a further modified form of holding post;

Figure 10 is an end view of the post shown in Figure 9;

Figure 11 is a view of the wire adapted for use in connection with the post shown in Figure 9;

Figure 12 is a further modified form of post;

Figure 13 is an end view thereof;

Figure 14 is a view of the wire to be used in connection with Figures 12 and 13;

Figure 15 is a still further modified form of wire holding post;

Figure 16 is an end view of the post shown in Figure 15;

Figure 17 is a view of the wire adapted for use in connection with the parts shown in Figure 15; and Figure 17ª represents a wire having a loop at one end with its body portion formed into an encircling loop and its other end twisted to said body portion.

Figures 21, 22, 23:
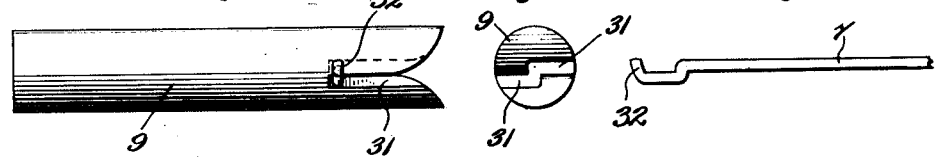
Figure 21 illustrates a still further modified form of holding post.
Figures 24, 25, 26:
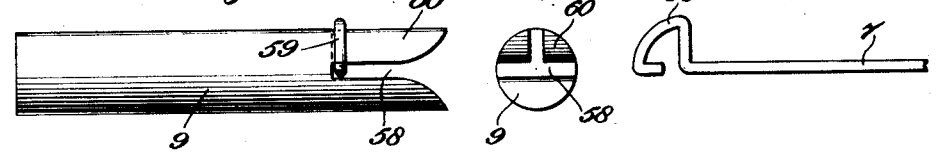
Figures 27, 28, 29, 30:
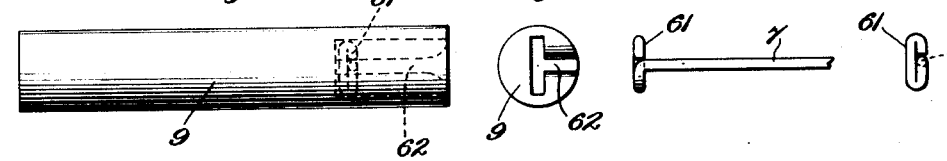
Figures 31, 32, 33:

Figure 22 an end view of the post shown in Figure 21;

Figure 23 is a view of the wire to be used with the post shown in Figure 22;

Figure 24 is another modified form of wire holding post;

Figure 25 is an end view of the post shown in Figure 24;

Figure 26 is a view of the wire to be used in connection with Figures 24 and 25;

Figure 27 is a side view of another modified form of holding post;

Figure 28 is an end view thereof;

Figures 29 and 30 are views of the wire to be used in connection with the post shown in Figure 27;

Figure 31 is a side view of a hollow form of post for holding wire;

Figure 32 is an end view of the post shown in Figure 31;

Figure 33 is a view of the wire to be used in connection with the post shown in Figure 31;

Figure 34 is a side elevational view of a still further modified form of holding post;

Figure 35 is an end view of the post shown in Figure 34 as seen from the right;

Figure 36 is a diagrammatic elevational view of the end of a wire suitable for use in the form of post shown in Figures 34 and 35;

Figure 37 is a diagrammatic side elevational view of a still further modified form of wire holding means;

Figure 38 is a fragmentary view from the end of the parts shown in Figure 37;

Figure 39 is a diagrammatic plan view of a wire end suitable for use in connection with the parts shown in Figures 37 and 38.

Figure 40 is a diagrammatic side elevational view of a still further modified form of wire holding post showing in connection therewith a retaining member for the wire bights;

Figure 41 is an end elevational view of the parts shown in Figure 40;

Figure 42 is a diagrammatic side elevational view of a still further modified form of wire holding means illustrating in addition to the retaining hook, an ejecting means; and Figure 43 is an end elevational view of the parts shown in Figure 42 as seen from the right of said figure.

In order that the precise invention may be the more clearly understood it is said:

When employing wire tying machines of the character here illustrated, it is necessary to use wires of considerable thickness in order to get the necessary strength to bind the boxes, lumber, or other packages which are to be wired, and as the machines are operated and moved by hand, it is very desirable indeed that the latter be made as light as possible, in order to attain the necessary speed or celerity of operation to make said machines commercially successful. Further, in order that the relatively heavy wire shall be successfully manipulated by the machines at a high rate of speed it is necessary that the wire shall be of a rather soft steel, but not yet too soft to be easily broken. We have found that a low carbon steel of say, from .2% to .3% is most desirable, and we have further found that in order to make these machines a success when in the hands of unskilled labor, each particular kind of machine should be furnished with that grade of wire which is best suited to its use.

In other words, after a machine is put out into use, we find it very desirable that the user thereof be discouraged from employing any kind of wire which may be readily purchasable by him, for otherwise, he is liable to find that the machine will jam, he is liable to find that the wire will break, he is liable to find that the wire will not readily adapt itself to the box, or stretch or tension sufficiently evenly when encircling the box, as to make a satisfactory joint, and he is liable to find a number of other discouraging difficulties, all of which he will be apt to ascribe to defects in the machine, when said defects are really due to the particular size or quality of the wire he is using.

In other words, we have found that where an unskilled operator has become thoroughly discouraged with the operation of his machine, that such discouragement can be readily turned into enthusiasm when he is furnished that particular quality and size of wire to which the machine is adapted.

Accordingly, the purpose of this invention when more specifically stated, is to provide the wire tying machines of the character above described with wire holding means, which will make it difficult for the user to employ a grade or size of wire that is not suitable for the machine, and to this end the invention may be said to consist in means rigid with the machine adapted to hold a wire of the proper kind which has either been deformed to fit said holding means, or which has been shaped as to not conveniently fit any other holding means.

In order to make the operation more clear, the machine illustrated in Figure 1 is substantially that disclosed in our copending application #418,634, filed October 22, 1920, and entitled Wire tensioning and twisting machine. In such machine 1 indicates any suitable base provided at one end with an upright extension 2 in which is journaled a shaft 3 provided at one end with a crank handle 4 and carrying at its other end a suitable twisting mechanism not illustrated, but which is positioned in the housing 5. Rigid with said housing is an extension provided with a slot 6 adapted to receive parallel bights 7 and 8 of the wire, and registering with said slot 6 is the slot of a twisting pinion, not shown, into which said bights 7 and 8 also fit and which causes said bights to be twisted together in the manner well known, all as illustrated in our copending application, above mentioned. 9 represents a holding post for receiving the extreme end 10 of the bight 7 of the wire, and also for receiving the portion 11 of said bight 8 in parallel relation with said end 9, all as is likewise well known in this type of machine. In the machines generally heretofore manufactured, however, the extreme end 10 of the wire, see Figure 1$^b$, has been of uniform cross section and the slot in the post 9 has been of a sufficient size to receive two parallel bights when they both were of the same cross section. It therefore follows that the user of the machine could select a wire of any quality at all, whether it were adapted for use in the machine or not, and secure its end 10 in the post 9, wrap it around the box as indicated in Figure 1, place the portion 11 of the bight 8 into said post 9, and pass said bight 8 through the slot 6 parallel to the bight 7, through the post 20', past the cutter 21, and around the periphery of the wheel 12, whereupon its extreme end 22 is secured in one of the notches 23, whereupon the lever 24 may be operated and the bights 7 and 8 twisted together, all in the manner disclosed in our said copending application above.

According to this invention, on the other hand, the end 10 of the bight 7, instead of being of a uniform cross section, is deformed, or is reduced in cross section, as is best shown in Figures 1$^b$ and 1$^c$. That is to say, said end 10 is provided with a flattened portion 13 bounded by the holding shoulders 14 and 15. Further, the slot 16 in the post 10 instead of being of uniform dimensions throughout, has its width reduced near its bottom portion to a slit 17 which is of the right dimensions to receive the flattened or deformed portion 13 of the bight 7, and is enlarged at its outward portion 16 to receive the full size of the portion 11 of the bight 8, as illustrated in Figures 1ª and 1ᵇ. In other words, as will be clear from the drawings, the user of this machine would secure the deformed portion 13 of the end 10 of the bight 7 in the slit 17, whereupon he would pass the wire entirely around the box, as illustrated, bringing the portion 11 of the bight 8 back into the slot 16, as is best illustrated in Figure 1ª, so that the two portions are in parallel relation to each other.

The bight 8 is then passed through the slot 6 through the post 20' under the cutter 21, and around the periphery of the wheel 12, whereupon it is put under tension and the bights 7 and 8 twisted together and cut off, all as is fully disclosed in our said application, above mentioned.

This method of securing the wire almost necessitates the user employing a wire having the deformed portion 13. Therefore, it enables the manufacturer of the machine to supply wire of the proper quality and size, especially deformed for use with the machine, and thus to more or less insure the proper operation of the machine.

In the machine illustrated in Figure 1, 18 represents a lever like member pivoted as at 19 to the housing 5 and which has the extending fork like portions 20 positioned behind the bights 7 and 8 of the wire, and therefore adapted when the lever 18 is operated to force out of the slot 6 the twisted bights of wire, all as is likewise disclosed in our said copending application.

Coming now to the somewhat modified form of the invention illustrated in Figures 2, 2ª, the end 10 of the wire instead of being flattened as indicated in the preceding figures, said end is provided with the reduced rounded portion 20', and the bottom of the slot 16 is correspondingly changed to accommodate said rounded portion, all as will be readily understood.

In the modified form of the invention illustrated in Figure 3 the slot 35 of the post 9 is provided with the angularly disposed portion 36, thus forming a holding member 37, and the extreme end 10 of the wire is bent into a hoop shape as illustrated in Figure 5, so that the angle 38 fits the said holding post 37, as will be clear from the drawings.

In the form of the invention shown in Figures 6, 7 and 8, the holding post 9 is provided with the slot 40 having the enlarged portion 41 into which fits the extreme end of the bight 7, so that the bent portion 42 thereof fits against the shoulder 43 of the post 9, as illustrated. In the form of the invention illustrated in Figures 9, 10 and 11 the post 9 is provided with the cruciform slot 44 while the bight 7 of the wire has its extreme end 45 bent into the sector shape shown, which is adapted to fit one of the holding members 46, as will be clear from the drawings.

In the form of the invention illustrated in Figures 12, 13 and 14 the slots 48 are parallel to each other as illustrated, leaving the central holding post 49 which is caught by the hook like portion 50 of the bight 7.

In the form shown in Figures 15, 16, and 17 the slot 51 is straight, while the end 52 of the bight 7 of the wire is formed in the semi-circular shape shown, which fits one of the portions 53 of the posts 9 as illustrated. Instead of forming the extreme end of the wire in the shape illustrated in Figures 11, 14 and 17, it, of course, may be provided with a loop such as 55, illustrated in Figures 17ª whereupon the entire wire may be passed around the package to be wired, and its bights 7 and 8 twisted together, as is shown at 56 in said Figure 17ª.

Figures 18, 19, 20:
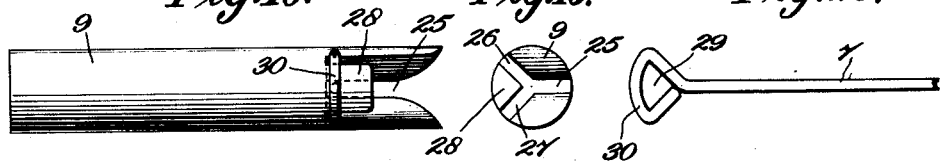
Figures 18 and 19 are further modified forms of holding post.
Figure 20 is a view of a wire to be used in connection with said post.

The still further modified form of the invention illustrated in Figures 18, 19 and 20, the slot 25 with which the post 9 is provided has two branches 26 and 27, to form a holding member 28. The extreme end of the bight 7 is bent into the triangular form shown, enclosing the space 29 which is occupied by the post 28 when the loop 30 of said wire is in place, all as will be clear from the drawings.

In the modified form of the invention illustrated in Figures 21, 22, and 23, the slot 31 is crooked or angularly shaped, as illustrated, and the extreme end 32 of the wire is correspondingly bent, as illustrated, to fit said slot 31.

In the form of the invention illustrated in Figures 24, 25 and 26, the post 9 is provided with the T-shaped slot 58 while the extreme end 59 of the bight 7 is shaped as shown, and is adapted to fit one of the holding members 60, as will be clear from the drawings.

In the still further modified form of the invention illustrated in Figures 27, 28, 29, and 30, the end 61 of the wire is bent in the form shown, while the T-shaped slot 62 in the post 9 has only one outlet, as illustrated, so that the head 61 fits therein in the manner illustrated.

In the form of the invention shown in Figures 31, 32, and 33, the post 64 is preferably made from a pipe, and is provided with a slot 65, while the end 66 of the bight 7 is of a circular shape, as illustrated, and of such a size as to fit the interior 67 of said post, all as will be clear from the drawings.

In the form of the invention shown in Figures 34, 35, and 36, the post 9 is provided with the angularly shaped slot 69, while the end 68 of the wire 7 is correspondingly bent to fit said slot. In this form of the invention, the bends of the end 68 may be varied in the manner of a Yale lock and key, so that only one class of machine may receive one class of wire.

In the form of the invention shown in Figures 37, 38, and 39, the post 9 is provided with a member 70 which is connected with the frame of the machine, and therefore is stationary during the twisting operation. Said member 70 is provided with a pin 71 over which the eye 72 of the end of the wire fits, while said wire is bent as at 73, and its bight portion 7 passes through the slot 74, preparatory to being twisted with the bight 8, to form the loop shown in Figure 17$^a$, all as will be clear from the drawings.

In the form of the invention shown in Figures 40, and 41, the post 77 is provided with the hook like lever 75 pivoted as at 76, and provided with the hook portion 78 which fits a slot 80 in the said post 77, and holds in place the bights of the wire 7 and 8, as shown. A pin 79 is attached to the member 20 of the lever 18, and underlies the said hook portion 78, so that when the lever 18 is operated to eject the twisted bights of the wire, the said pin 79 lifts the hook 78 and frees the said bights 7 and 8.

In the form of the invention shown in Figures 42 and 43, the hook like lever 81 is of a somewhat different form from the lever 75, and it overlies the slidable member 82 provided with the pin 83, over which fits a loop of the wire, not shown. Said slidable member 82 is provided with the beveled portion 84 adapted to take against the hook like portion 85 of the lever 81, and to lift said lever 81 when the member 82 is slid toward the right as seen in Figure 42, by means of the lever 18, or by any other means not shown. It is preferred, however, to connect said member 82 with the member 20 of the lever 18 in the manner shown, all as will be clear from Figures 1 and 43.

In Figure 42, the numeral 86 represents a portion of the frame; 87 represents a post; and 88 represents the pivot of the lever 81.

It will now be clear that in the foregoing constructions, we may either deform the cross section of the wire, or we may form its extreme end 10 into a variety of shapes, while the slots in the post 9 are correspondingly changed to fit said ends. As a matter of fact, in Figures 3 and 43, instead of having the specially shaped ends of the wire of the same cross section as is the body of the wire, I may change their cross sections or deform said cross sections in the manner somewhat similar to that illustrated in Figures 1$^b$, 1$^c$, and 2$^a$, whereupon, of course, the sizes of the various slots will be likewise changed so as to exclude any other cross sections.

From the foregoing description it will be seen that we provide the machine, as a part thereof, with a stationary holding or anchoring post or member 9, which, in one specific form or another, of the various forms shown, is constructed to receive and efficiently anchor one end or portion of a binder wire while the other end or another portion thereof is being trained around a box, package, container, or the like, to which the wire is to be applied, and while the entrained wire or portion is being placed under tension and portions thereof are being intertwisted into a securing knot by which the tensioned binder wire is held and maintained in tension as applied to the box, or the like. It will also be seen that, in each instance of the various forms shown, the holding part is of such structure, formation or arrangement as to enable it to receive and anchor a binder wire of a corresponding structure or formation into which it has been previously fabricated, and that, in each instance the binder wire is efficiently anchored and securely held by the post structure against the pull exerted on the wires by the tensioning devices while the wire is being tensioned around the box, package or the like, and while the intertwisting operation is being accomplished, thus enabling us to secure the benefits and advantages, and to avoid the troubles and difficulties hereinbefore pointed out.

We do not claim specifically herein the structures shown in Figs. 1$^a$, 1$^b$, 1$^c$, 2, 2$^a$, nor those shown in Figs. 37, 38 and 39, as said structures form the subject matter of applications divided herefrom.

It is therefore obvious that those skilled in the art may vary the details of construction, as well as the arrangement of parts without departing from the spirit of the invention, and we do not wish to be limited to the above disclosure, except as may be required by the claims.

What we claim is:

1. In a wire tying machine, the combination of wire holding means provided with a slot of an irregular predetermined shape and formed to receive a wire having a portion thereof so shaped and formed as to fit and anchor in said slot; and means to twist together parallel portions of said wire, substantially as described.

2. In a wire tying machine, and in combination with wire tensioning devices, a fixed anchor member provided in said machine, said anchor member having means to receive and accommodate and form an abutting engagement for a structure of wire which is preformed to effect such abutting engagement with said anchor member means, whereby said wire is anchored against the action of the tensioning devices.

3. In a wire tying machine, and in combination with wire tensioning devices, a fixed anchor part having an open ended slot and means associated with said slot to receive and accommodate and form an abutting engagement for a structure of wire which is preformed to effect such abutting engagement, whereby said wire is anchored against the pull of the tensioning devices.

4. In a wire tying machine, and in combination with wire tensioning devices, a stationary anchor part having an opening in its free end, and means to form an abutting engagement for a previously bent end portion of the wire, whereby the wire is anchored against the pull of the tensioning devices.

5. In a wire tying machine, and in combination with wire tensioning devices, a stationary anchor part on said machine disposed to extend transversely to the line of entraining of the wire to be tied, through the tying machine, said part having an opening in the end surface thereof, and means associated with said opening to form an abutting engagement for a preformed portion of the wire, whereby the wire is anchored against the pull of the tensioning devices.

6. In a wire tying machine, and in combination with wire tensioning devices, a stationary anchor part on said machine disposed to extend transversely to the line of entraining of the wire to be tied, through the tying machine, said part having an opening in the end surface thereof, said opening provided with a construction to form an abutting shoulder for a preformed bent portion at the end of the wire, whereby the wire is anchored against the pull of the tensioning devices.

7. In a wire tying machine, and in combination with wire tensioning devices, a stationary anchor part on said machine disposed to extend transversely to the line of entraining of the wire to be tied, through the tying machine, said part having a slot opening in the end surface thereof, said slot having relatively angular portions to receive and accommodate and providing an abutting engagement for a preformed bent portion of the end of the wire, whereby the wire is anchored against the pull of the tensioning devices.

In testimony whereof we affix our signatures.

ALEC J. GERRARD.
PARVIN WRIGHT.